United States Patent
Messenger et al.

(10) Patent No.: US 10,928,258 B2
(45) Date of Patent: Feb. 23, 2021

(54) PLATFORM LOAD SENSING SYSTEM

(71) Applicant: JLG Industries, Inc., McConnellsburg, PA (US)

(72) Inventors: John E. Messenger, Newville, PA (US); Jeffrey Lynn Addleman, Chambersburg, PA (US); Timothy Mark Waltz, Smithsburg, MD (US); Troy Young, Mercersburg, PA (US)

(73) Assignee: JLG INDUSTRIES, INC., McConnellsburg, PA (US)

( * ) Notice: Subject to any disclaimer, the term of this patent is extended or adjusted under 35 U.S.C. 154(b) by 178 days.

(21) Appl. No.: 16/322,005

(22) PCT Filed: Apr. 10, 2017

(86) PCT No.: PCT/US2017/026761
§ 371 (c)(1),
(2) Date: Jan. 30, 2019

(87) PCT Pub. No.: WO2017/177219
PCT Pub. Date: Oct. 12, 2017

(65) Prior Publication Data
US 2019/0195705 A1    Jun. 27, 2019

Related U.S. Application Data

(60) Provisional application No. 62/320,033, filed on Apr. 8, 2016.

(51) Int. Cl.
*G01L 1/22* (2006.01)
*B66F 11/04* (2006.01)
(Continued)

(52) U.S. Cl.
CPC .............. *G01L 1/22* (2013.01); *B66F 9/0655* (2013.01); *B66F 11/046* (2013.01);
(Continued)

(58) Field of Classification Search
CPC ........ G01L 1/22; G01G 3/1402; G01G 19/12; B66F 9/0655; B66F 11/046; B66F 17/006
(Continued)

(56) References Cited

U.S. PATENT DOCUMENTS

| 4,799,562 A | 1/1989 | Burrows et al. |
| 6,585,079 B1 | 7/2003 | Weyer |

(Continued)

FOREIGN PATENT DOCUMENTS

| CN | 205114986 U | 3/2016 |
| JP | 6-14195 | 2/1994 |

(Continued)

OTHER PUBLICATIONS

Japanese Office Action dated Oct. 15, 2019 issued in Japanese Patent Application No. 2018552825 and English Translation, 10 pp.

(Continued)

*Primary Examiner* — Octavia Hollington
(74) *Attorney, Agent, or Firm* — Nixon & Vanderhye P.C.

(57) ABSTRACT

A platform load sensing system connected between a boom and a platform includes an upper bearing link connecting the boom side to the platform side, and a lower bearing link connecting the boom side to the platform side. The upper and lower bearing links are configured to allow for relative motion between the boom side and the platform side. A load member is secured to the platform side between the upper and lower bearing links, and a load cell is secured to the boom side. A load moment on the platform side is functionally eliminated by the upper and lower bearing links, and a vertical load on the platform side is transferred through the load member to the load cell.

13 Claims, 4 Drawing Sheets

(51) Int. Cl.
   *B66F 17/00*    (2006.01)
   *G01G 19/12*    (2006.01)
   *B66F 9/065*    (2006.01)
   *G01G 3/14*     (2006.01)

(52) U.S. Cl.
   CPC ......... *B66F 17/006* (2013.01); *G01G 3/1402* (2013.01); *G01G 19/12* (2013.01)

(58) Field of Classification Search
   USPC .................................................. 73/862.632
   See application file for complete search history.

(56) References Cited

U.S. PATENT DOCUMENTS

| | | | |
|---|---|---|---|
| 6,842,118 B2* | 1/2005 | Igarashi | B66F 17/006 340/438 |
| 7,004,285 B2* | 2/2006 | Bailey | B66F 11/046 182/19 |
| 9,873,602 B2* | 1/2018 | Beck | B66F 17/006 |
| 2002/0144862 A1 | 10/2002 | Engvall et al. | |
| 2006/0045713 A1 | 3/2006 | Magni | |
| 2006/0120848 A1 | 6/2006 | Guhr | |
| 2012/0175169 A1 | 7/2012 | Siaw | |
| 2013/0096799 A1 | 4/2013 | Horne | |

FOREIGN PATENT DOCUMENTS

| | | |
|---|---|---|
| JP | 7-4495 | 1/1995 |
| JP | 9-67099 | 3/1997 |
| NL | 1023556 | 11/2004 |

OTHER PUBLICATIONS

Chinese Office Action dated Sep. 30, 2019 issued in Chinese Patent Application No. 201780022403.8 and English translation, 11 pp.
International Search Report dated Jun. 27, 2017 issued in PCT International Patent Application No. PCT/US2017/026761, 1 page.

* cited by examiner

PLATFORM LOAD SENSING SYSTEM

CROSS-REFERENCES TO RELATED APPLICATIONS

This application is the U.S. national phase of International Application No. PCT/US2017/026761 filed Apr. 10, 2017 which designated the U.S. and claims priority to U.S. Provisional Patent Application No. 62/320,033 filed Apr. 8, 2016, the entire contents of each of which are hereby incorporated by reference.

STATEMENT REGARDING FEDERALLY SPONSORED RESEARCH OR DEVELOPMENT (NOT APPLICABLE)

BACKGROUND

The invention relates to a platform load sensing system and, more particularly, to a single shear-beam load sense system with a controlled load path from the platform side to the boom side.

Existing platform supports are typically directly bolted to a boom without allowance for relative vertical motion. As such, the rotator weldment receives forces from two sources including the vertical load (weight of the support plus platform plus payload) and the moment of that weight (combination of the weight and its distance from the rotator). Since load sensing system performance requirements are specific to the vertical load, sensing system designs attempt to separate the two loads. This typically has involved complex mechanisms with springs, which typically exhibit large errors in actual vertical load measurement.

It would be desirable to isolate the platform load from its associated moment for a more accurate measure of platform load.

BRIEF SUMMARY

The load sensing system according to the described embodiments is comprised of two sides that are pivotally connected and include a controlled load path from the platform side to the boom side. Upper and lower link assemblies allow for relative motion between the two sides. The platform load is transferred from the platform side through a shear beam load cell into the boom side. Please note that herein, the phrase "single shear beam load cell" or "shear beam load cell" is understood to be a metal block with an engineered shape and an integral electrical strain gage, so that the strain gage output can be directly interpreted as a force due to the block's controlled shape. The load moment is transferred through the upper and lower bearing links, and the design thus separates the platform load from its associated moment. The cooperation of a load path inclusive of a spherical surface (e.g., a carriage bolt) and the load cell are controlled in both surface and mechanical properties to ensure that the shear beam load cell is exposed only to the combined weight of the platform support, platform and payload on the platform in a perpendicular direction to the working axis of the load cell. This arrangement maximizes the accuracy of the readings by minimizing tangential components of the applied load at the interface surface.

In an exemplary embodiment, a platform load sensing system connected between a boom via a boom side and a platform via a platform side includes an upper bearing link connecting the boom side to the platform side, and a lower bearing link connecting the boom side to the platform side. The upper and lower bearing links are configured to allow for relative motion between the boom side and the platform side. A load member with a contact surface is cooperable with the platform side between the upper and lower bearing links, represented in some embodiments as a carriage bolt, and a load cell is secured to the boom side. The load moment from the platform side is functionally eliminated because the pivotal nature of the upper and lower bearing links does not transfer moment, and the vertical load from the platform side is transferred through the load member to the load cell.

The upper bearing link may be pinned to the boom side and the platform side, and the lower bearing link may be pinned to the boom side and the platform side. The platform side may include a platform support weldment to which a work platform may be securable. In some embodiments, a head of the load member engages the load cell, where the load member head may be treated, for example by being smoothed.

The load sensing system may additionally include a first stop member secured to the boom side and a second stop member, spaced from the first stop member, secured to the platform side. In this context, the first and second stop members limit an upward displacement distance of the platform side relative to the boom side.

The load sensing system may additionally include a control system that receives and processes output from the load cell through a controller area network (CAN), the control system outputting load cell data and diagnostic information based on the output from the load cell. The control system may output an error when the output from the load cell indicates at least one of: (a) no data output from the load cell; (b) load cell not calibrated; (c) underweight may be detected, by determining that a platform load may be less than a calibrated weight or when the platform load remains negative while the platform may be moving; and (d) stagnate may be detected, by determining that the platform load remains unchanged while the platform may be moving. The control system may be programmed to compare the vertical load to a platform capacity, where the control system may be programmed to output an overload signal when the vertical load is greater than the platform capacity.

In another exemplary embodiment, an aerial work platform vehicle includes a vehicle base; at least one boom connected with the vehicle base; a work platform connected to the at least one boom; and the platform load sensing system connected between the at least one boom via a boom side and the work platform via a platform side. The control system may be programmed to modify the operation of the aerial work platform vehicle based on the output from the load cell.

BRIEF DESCRIPTION OF THE DRAWINGS

These and other aspects and advantages will be described in detail with reference to the accompanying drawings, in which.

DETAILED DESCRIPTION

In the following description, the design will be described in the context of an exemplary application to an aerial work platform (AWP) vehicle. It is noted that the design is applicable to non-wheeled AWPs as well as other boom concepts that do not include a "tower" boom, and the invention is not meant to be limited to the exemplary application described.

Figure 1:
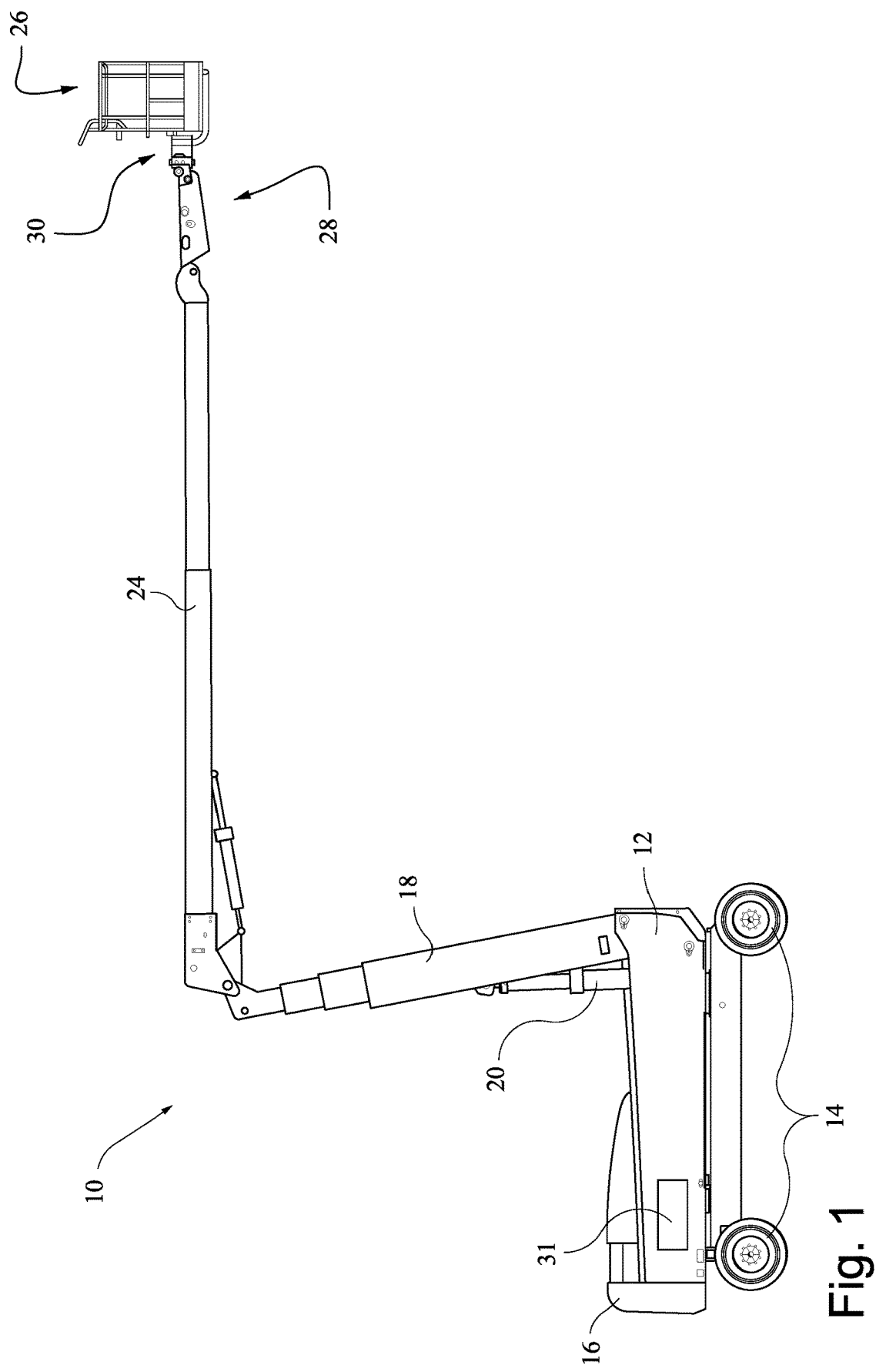
FIG. 1 shows an exemplary boom lift supporting an aerial work platform.

FIG. 1 shows an exemplary aerial work platform vehicle 10 including a vehicle base 12 supported on wheels 14 and including a counterweight 16. A tower boom 18 is pivotally connected to the vehicle base 12 and is pivoted by a lifting cylinder 20. An upper boom 24 is pivotally connected to the tower boom 18, and a work platform 26 is connected via a jib 28 or the like to the upper boom 24. A platform load sensing system 30 is connected between the upper boom 24 via a boom side framework ("boom side") and the work platform 26 via a platform framework or weldment ("platform side"). A control system or controller 31 is shown schematically in FIG. 1. The control system 31 communicates with the load sensing system 30 and controls operation of the vehicle 10.

Figure 2:
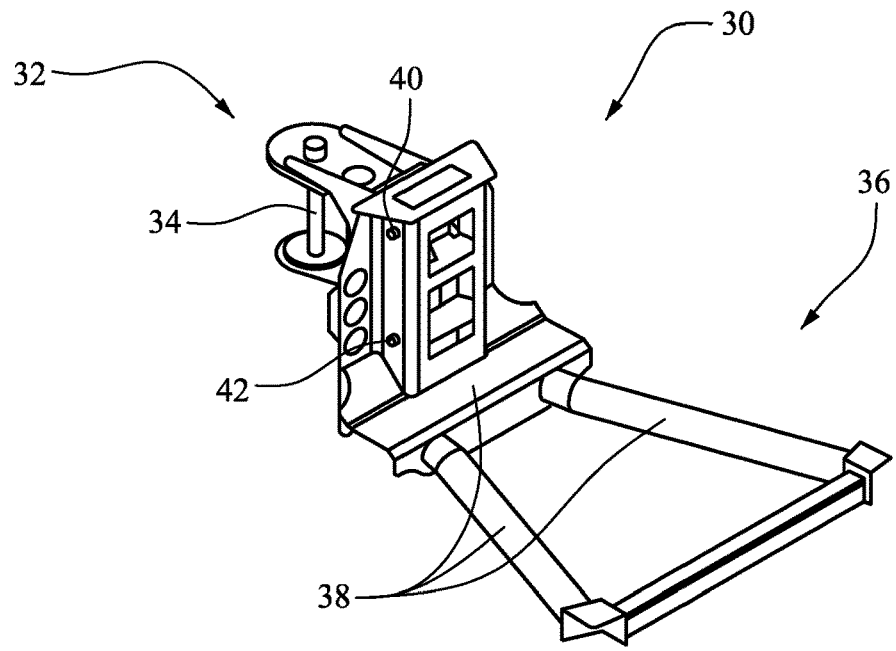
FIG. 2 is a perspective view of a platform support assembly.
Figure 3:
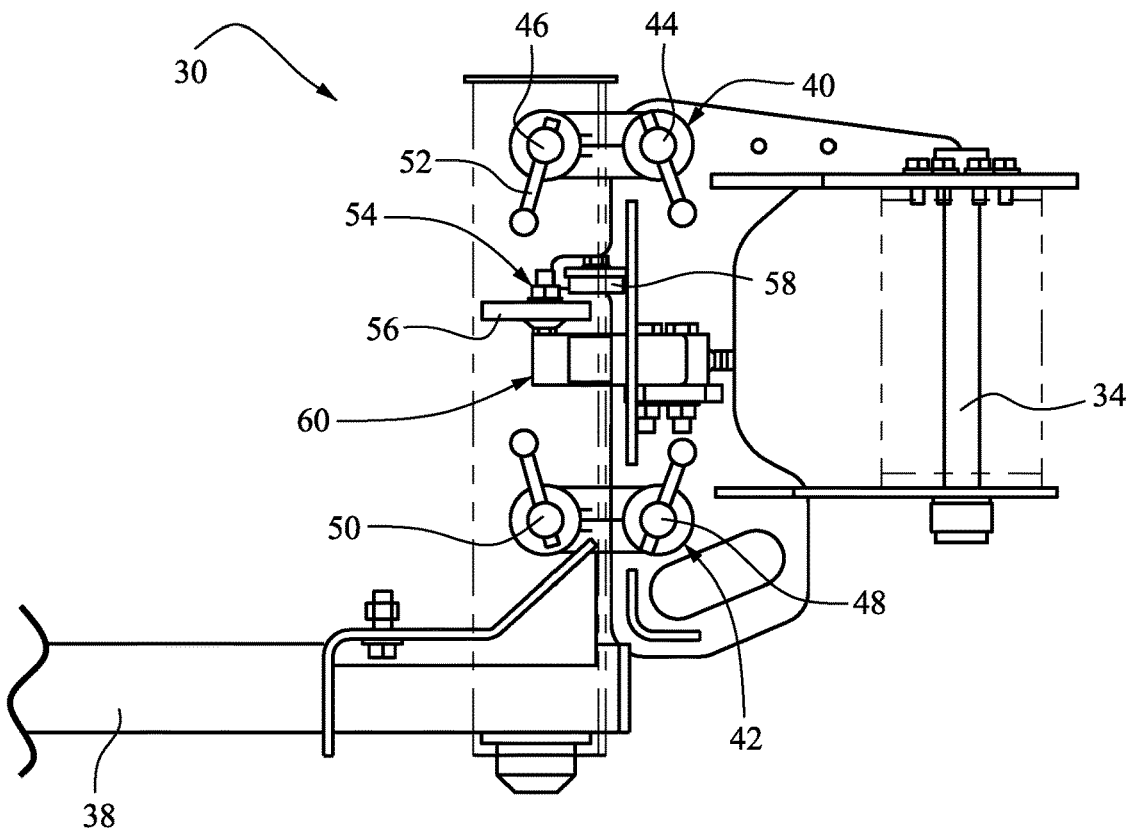
FIG. 3 is a side view of the load sensing system.

FIGS. 2 and 3 show the platform load sensing system 30 connected between the boom 24 and the platform 26. The boom side 32 comprises a framework including a pin 34 to which the boom 24 or jib 28 may be directly connected. The boom side 32 may be provided with a rotary actuator that allows the operator to rotationally change a position of the platform 26. The platform side 36 is comprised of a platform weldment 38 to which the platform 26 may be secured. The boom side 32 is connected to the platform side 36 by an upper bearing link 40 and a lower bearing link 42. The upper and lower bearing links 40, 42 allow for relative motion between the two sides 32, 36. The upper bearing link 40 is pinned to the boom side via pin 44 and to the platform side 32 via pin 46. Similarly, the lower bearing link 42 is pinned to the boom side via pin 48 and pinned to the platform side via pin 50. The pins 44, 46, 48, 50 are prevented from rotation using any suitable means, for example by suitable lock pins 52 that extend through openings in outer distal ends of the pins 44, 46, 48, 50.

Figure 4:
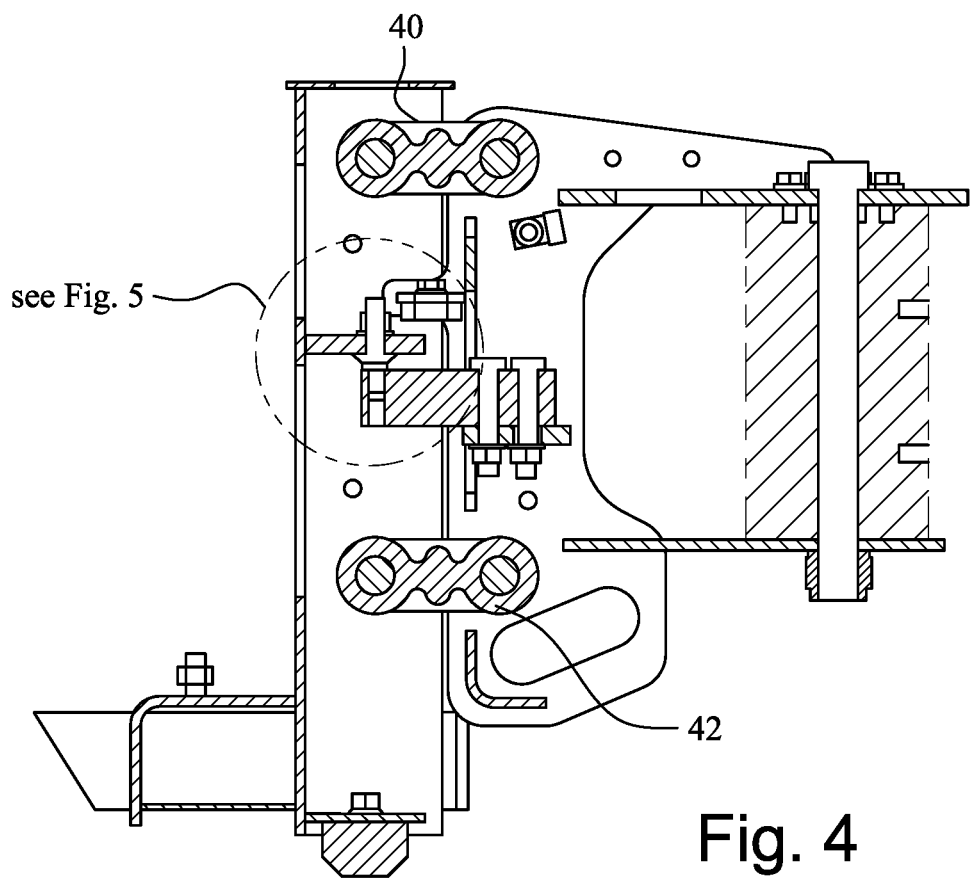
FIG. 4 is a sectional view through a center of the load sensing system.

A load member 54 such as a carriage bolt or the like is secured to the platform side 36 via a first part 56 of a stop plate assembly that is fixed to the platform weldment 38. A second part 58 of the stop plate assembly is fixed to the boom side 32. A load cell 60 is fixed to the boom side 32 below the first part 56 of the stop assembly. The load member 54 is positioned to engage the load cell 60. In the exemplary embodiment shown in FIGS. 3-5, a hex bolt 62 or the like is secured in an opening in the load cell 60, and a head 64 of the load member 54 is engaged with the load cell 60 via the hex bolt 62. In some embodiments, the head 64 of the load member 54 may directly engage the load cell 60 without the use of the hex bolt 62 or the like, depending on the construction of the load cell 60. An exemplary load cell is available from Vishay Precision Group (VPG) of Rancho Cucamonga, Calif. In some embodiments, the head 64 of the load member 54 and its engagement with the load cell 60 (e.g., hex bolt 62) are controlled in both surface and mechanical properties. For example, the load member (e.g., carriage bolt) head 64 may be machined, coated or otherwise processed before installation in order to provide an appropriate friction reducing surface finish.

Because the upper and lower bearing links 40, 42 allow for relative motion between the boom side 32 and the platform side 36, a load on the platform 26 can be separated from its associated moment. That is, the load moment is functionally eliminated by the upper and lower bearing links 40, 42. With the load moment separated from the platform load, the load cell 60 is thus exposed only to the combined weight of the platform weldment 38, the platform 26 and a load on the platform 26 in a perpendicular direction to the working axis of load cell 60. This construction maximizes the accuracy of the readings by minimizing the tangential components of the applied load at the interface surface.

Figure 5:
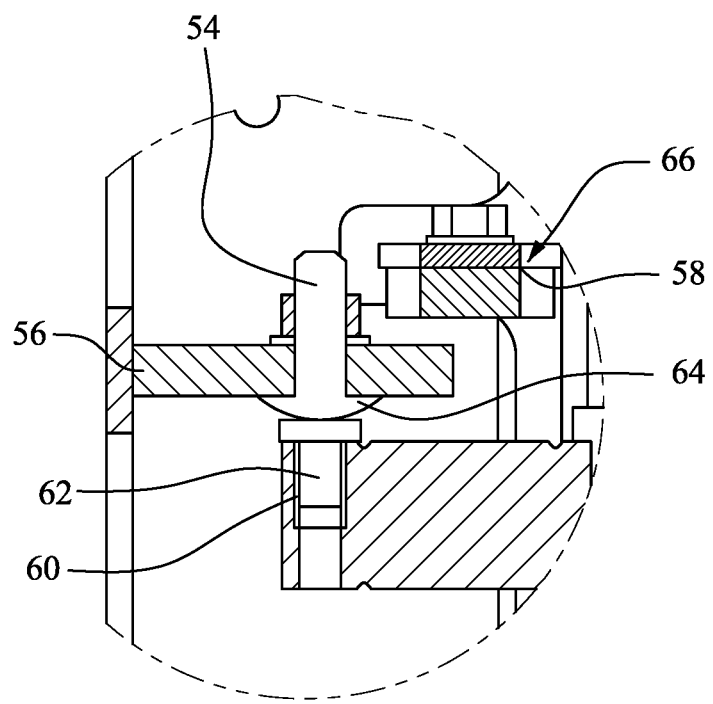
FIG. 5 is a close-up view of the load member in the exemplary form of a carriage bolt and load cell.

With continued reference to FIG. 5, a vertical gap 66 exists between the first and second parts 56, 58 of the stop assembly. If the platform 26 is lowered onto a surface or is otherwise subjected to an upward vertical force, the platform side 36 will rise up relative to the boom side 32, thereby unloading the load cell 60 until the gap 66 closes and further motion is prohibited. The stop assembly including the first and second parts 56, 58 serves to limit the upward displacement of the platform side 36 to thereby prevent the load cell electronics from losing calibration due to the upwards force applied to the bottom of the platform 26.

The structural weldments, links, pins and bearings are engineered to functionally eliminate deflections, which minimizes friction between the link pins and bearings, which thereby improves the overall accuracy of the system. In some embodiments, low-friction, metal-polymer bearings are installed in the links, along with composite thrust bearings between the links and their mating weldments, which similarly serve to minimize friction and thereby improve the overall accuracy of the system. The material selection of the bearings may eliminate the need for periodically applying lubricant, thereby preserving the long-term accuracy of the system.

In an exemplary construction, the load cell 60 may be a single device with redundant internal strain gauges. The load cell 60 performs diagnostics on each strain gauge independently and outputs error codes when issues are detected. The load cell 60 transmits the strain gauge measurements, diagnostic information and a serial number over a controller area network (CAN) to the vehicle control system 31 using a predetermined protocol.

Figure 6:
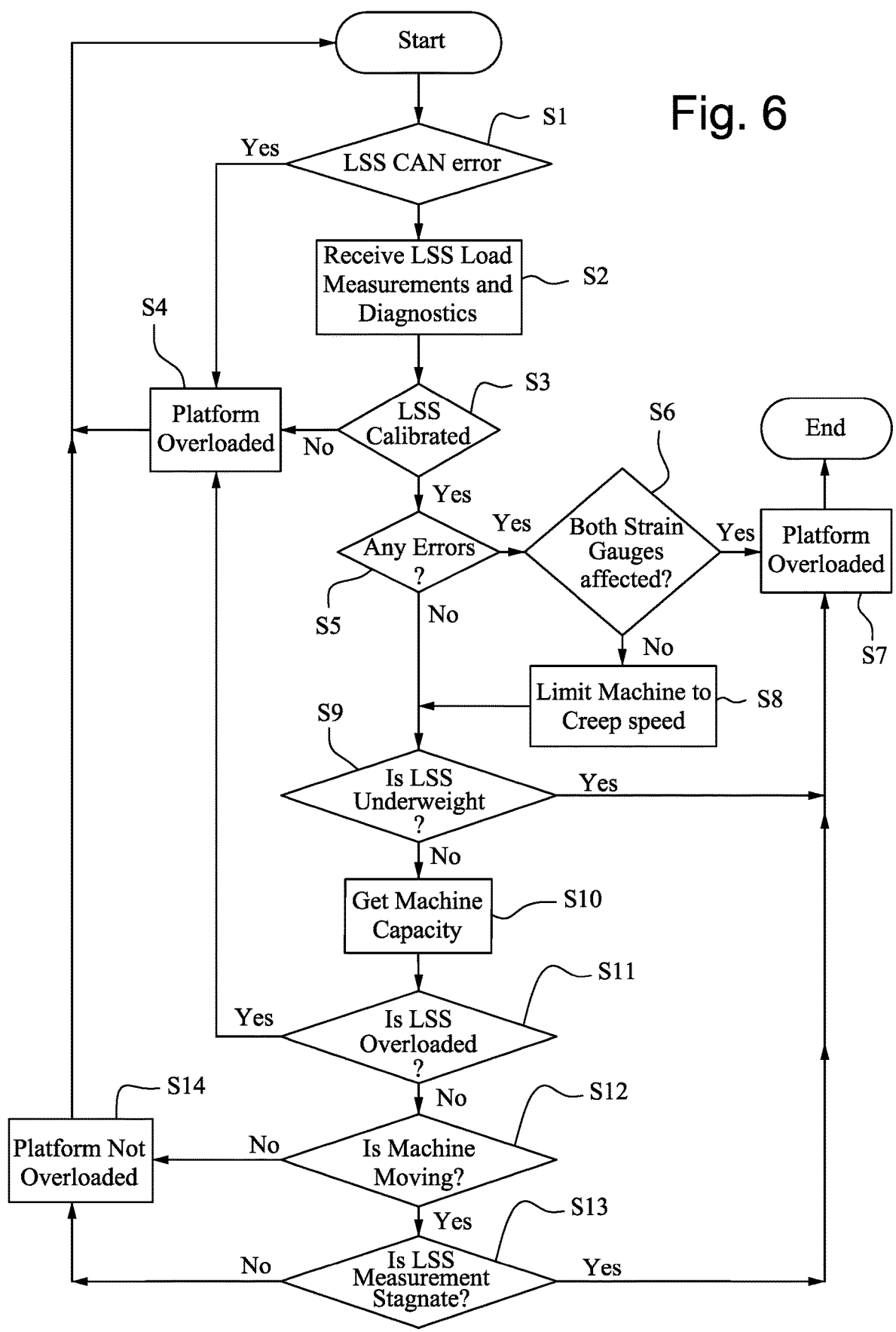
FIG. 6 is a flow chart showing an operational process of the control system.

FIG. 6 is a flow chart showing operation of the control system 31 relative to the load sensing system 30. The control system 31 checks for various errors based on output from the load cell 60. In step S1, the control system checks for internal CAN or load cell errors, for example if the control system does not receive messages from the load cell. The control system receives load cell measurements and diagnostic information via CAN (S2) and checks to ensure that the load cell is properly calibrated (S3). In some embodiments, the load cell calibration is detected by comparing the load cell serial number to what was stored by the control system during the last load cell calibration. If the load cell is not properly calibrated (no in S3), a "platform overloaded" status is output (S4). The control system checks for errors in step S5 and if so (yes in S5), the control system determines whether both strain gauges are affected (S6). If both strain gauges are affected (yes in S6), a "platform overloaded" status is reported (S7); if only one strain gauge is affected (no in S6), the control system limits the machine to creep speed (S8).

The control system checks whether a load cell underweight status is detected (S9) when the platform load is significantly less than the calibrated weight or if the platform load remains negative while the machine is moving. If so (yes in S9), a "platform overloaded" status is output (S7). A machine capacity may be determined by the control system (S10) based on the machine model and/or a platform capacity switch. A platform capacity switch may be an operator controlled switch used to determine if the platform capacity is restricted (higher load capacity) or unrestricted (reduced load capacity).

In step S11, the control system determines whether the load cell is overloaded by comparing a load on the platform with the machine capacity. The control system will output the "platform overloaded" status if the platform load is greater than the platform capacity for a predetermined amount of time. The control system also determines whether the machine is moving (S12), and if so (yes in S12), the control system determines whether a load cell stagnate error is detected (S13), i.e., when the platform load remains unchanged while the machine is moving. If the machine is not moving (no in S12) or the load cell measurement stagnate is not detected (no in S13), the control system outputs a "platform not overloaded" status (S14). The control system response to an error thus depends on the error as noted above.

The load sensing system of the described embodiments includes two sides that are pivotally connected and include a controlled load path from the platform side to the boom side. Both sides are engineered structures that support and transfer loads. The relative motion between the two sides and the pair of controlled surfaces through which load is transferred from the platform side improves accuracy as compared with existing systems by separating the platform load from its associated moment through the upper and lower bearing links. Surfaces of the load path via the load member and the load cell are controlled in both surface and mechanical properties to ensure that the shear beam load cell is exposed only to the combined weight of the platform support, platform and payload on the platform in a perpendicular direction to the working axis of the load cell. This maximizes the accuracy of the readings by minimizing tangential components of the applied load at the interface surface.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A platform load sensing system connected between a boom via a boom side and a platform via a platform side, the platform load sensing system comprising:
    an upper bearing link connecting the boom side to the platform side;
    a lower bearing link connecting the boom side to the platform side, wherein the upper and lower bearing links are configured to allow for relative motion between the boom side and the platform side;
    a load member with a contact surface secured to the platform side between the upper and lower bearing links;
    a load cell secured to the boom side;
    a first stop member secured to the boom side; and
    a second stop member secured to the platform side, wherein the load member is secured to the platform side via the second stop member, and wherein the second stop member is spaced from the first stop member such that the space is maintained until the platform is subjected to an upward vertical force,
    wherein a load moment on the platform side is functionally eliminated by the upper and lower bearing links, wherein the load cell is positioned to limit a downward displacement distance of the platform side relative to the boom side such that a vertical load on the platform side is transferred through the load member to the load cell, and wherein the first and second stop members limit an upward displacement distance of the platform side relative to the boom side.

2. A platform load sensing system according to claim 1, wherein the upper bearing link is pinned to the boom side and the platform side, and wherein the lower bearing link is pinned to the boom side and the platform side.

3. A platform load sensing system according to claim 1, wherein the platform side comprises a platform support weldment to which a work platform is securable.

4. A platform load sensing system according to claim 1, wherein a head of the load member engages the load cell, and wherein the load member head is treated.

5. A platform load sensing system according to claim 4, wherein the load member head is smoothed.

6. A platform load sensing system according to claim 1, further comprising a control system that receives and processes output from the load cell through a controller area network (CAN), the control system outputting load cell data and diagnostic information based on the output from the load cell.

7. A platform load sensing system according to claim 6, wherein the control system outputs an error when the output from the load cell indicates at least one of:
    (a) no data output from the load cell;
    (b) load cell not calibrated;
    (c) underweight is detected, by determining that a platform load is less than a calibrated weight or when the platform load remains negative while the platform is moving; and
    (d) stagnate is detected, by determining that the platform load remains unchanged while the platform is moving.

8. A platform load sensing system according to claim 6, wherein the control system is programmed to compare the vertical load to a platform capacity, and wherein the control system is programmed to output an overload signal when the vertical load is greater than the platform capacity.

9. An aerial work platform vehicle comprising:
    a vehicle base;
    at least one boom connected with the vehicle base;
    a work platform connected to the at least one boom; and
    a platform load sensing system connected between the at least one boom via a boom side and the work platform via a platform side, the platform load sensing system including:
        an upper bearing link connecting the boom side to the platform side,
        a lower bearing link connecting the boom side to the platform side, wherein the upper and lower bearing links are configured to allow for relative motion between the boom side and the platform side,
        a load member secured to the platform side between the upper and lower bearing links,
        a load cell secured to the boom side,
        a first stop member secured to the boom side, and
        a second stop member secured to the platform side, wherein the load member is secured to the platform side via the second stop member, and wherein the second stop member is spaced from the first stop member such that the space is maintained until the platform is subjected to an upward vertical force, wherein a load moment on the platform side is functionally eliminated by the upper and lower bearing links, wherein the load cell is positioned to limit a downward displacement distance of the platform side relative to the boom side such that a vertical load on the platform side is transferred through the load member to the load cell, and wherein the first and second stop members limit an upward displacement distance of the platform side relative to the boom side.

10. An aerial work platform vehicle according to claim 9, further comprising a control system that receives and processes output from the load cell through a controller area network (CAN) and that controls operation of the aerial work platform vehicle, the control system outputting load cell data and diagnostic information based on the output from the load cell.

11. An aerial work platform vehicle according to claim 10, wherein the control system outputs an error when the output from the load cell indicates at least one of:
 (a) no data output from the load cell;
 (b) load cell not calibrated;
 (c) underweight is detected, by determining that a platform load is less than a calibrated weight or when the platform load remains negative while the platform is moving; and
 (d) stagnate is detected, by determining that the platform load remains unchanged while the platform is moving.

12. An aerial work platform vehicle according to claim 11, wherein the control system is programmed to modify the operation of the aerial work platform vehicle based on the output from the load cell.

13. An aerial work platform according to claim 9, wherein the platform side comprises a platform support weldment to which the work platform is secured.

* * * * *